United States Patent [19]

Fukae et al.

[11] Patent Number: 4,748,682
[45] Date of Patent: May 31, 1988

[54] COMBINED DIVERSITY RECEIVING APPARATUS

[75] Inventors: Tadamasa Fukae; Hiroshi Noda, both of Hyogo, Japan

[73] Assignee: Mitsubishi Denki Kabushiki Kaisha, Tokyo, Japan

[21] Appl. No.: 816,797

[22] Filed: Jan. 7, 1986

[30] Foreign Application Priority Data

| Jan. 8, 1985 | [JP] | Japan | 60-1189 |
| Jan. 8, 1985 | [JP] | Japan | 60-1190 |
| Jan. 24, 1985 | [JP] | Japan | 60-12022 |
| Jan. 28, 1985 | [JP] | Japan | 60-13828 |
| Feb. 4, 1985 | [JP] | Japan | 60-19515 |
| Feb. 4, 1985 | [JP] | Japan | 60-19517 |
| Feb. 4, 1985 | [JP] | Japan | 60-19518 |

[51] Int. Cl.$^4$ .................. H04B 11/16; H04B 7/02
[52] U.S. Cl. .................. 455/137; 455/245; 455/276; 375/40
[58] Field of Search .............. 455/137, 138, 234, 235, 455/245, 246, 247, 272, 273, 276, 277, 278, 304; 375/40, 100; 381/1, 2

[56] References Cited

U.S. PATENT DOCUMENTS

| 2,113,212 | 4/1938 | Landon | 455/304 |
| 2,683,213 | 7/1954 | Earp | 455/276 |
| 3,911,364 | 10/1975 | Langseth et al. | 375/40 |
| 3,965,422 | 6/1976 | Tagliaferri | 455/138 |
| 4,027,247 | 5/1977 | Aranguren | 375/40 |
| 4,291,410 | 9/1981 | Caples et al. | 375/100 |
| 4,334,316 | 6/1982 | Tanaka | 455/304 |
| 4,369,520 | 1/1983 | Cerny, Jr. et al. | 455/137 |
| 4,404,563 | 9/1983 | Richardson | 455/137 |
| 4,525,861 | 6/1985 | Freeburg | 455/137 |

FOREIGN PATENT DOCUMENTS

| 57-125536 | 6/1982 | Japan. | |
| 0601830 | 4/1978 | U.S.S.R. | 455/137 |

*Primary Examiner*—Robert L. Griffin
*Assistant Examiner*—Curtis Kuntz
*Attorney, Agent, or Firm*—Bernard, Rothwell & Brown

[57] ABSTRACT

A combined diversity receiving apparatus comprises first mixers for mixing receiving signals from plural antennas with a signal from a feedback circuit, band-pass filters connected to outputs of the first mixers and having a band width to pass a random phase component due to fading and a main component of a modulation signal among received signals, second mixers for mixing output signals of the band-pass filters with the received signals, a coupler for combining outputs of the second mixers, and a feedback circuit for feeding back the output signal of the coupler to the first mixers.

11 Claims, 12 Drawing Sheets

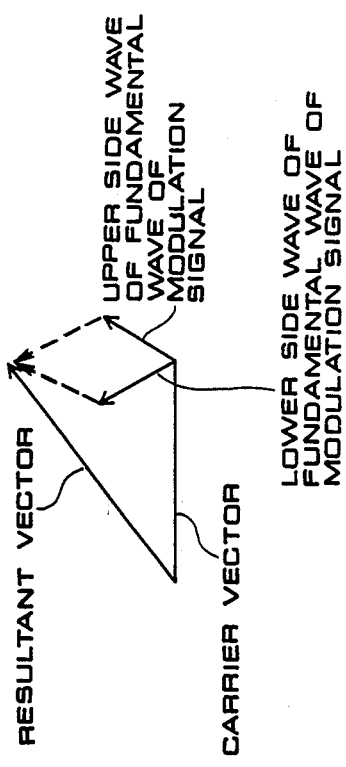
FIG. 2(a)
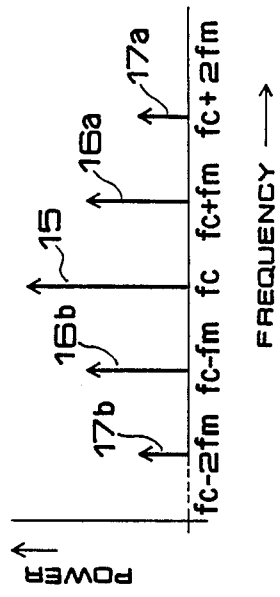
FIG. 2(b)
FIG. 2 (PRIOR ART)
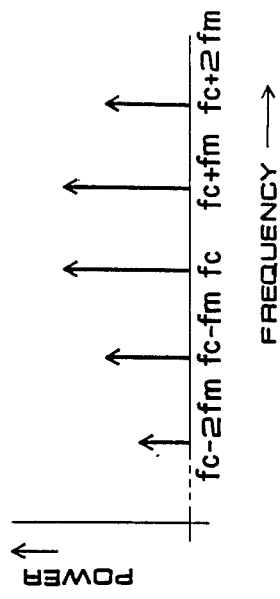
FIG. 2(d)
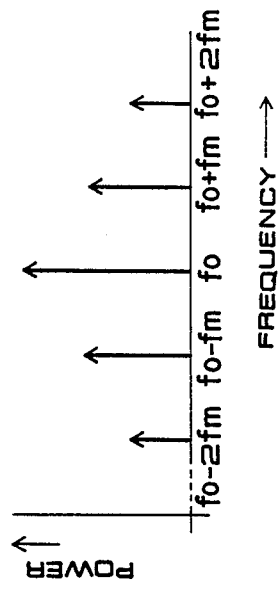
FIG. 2(c)

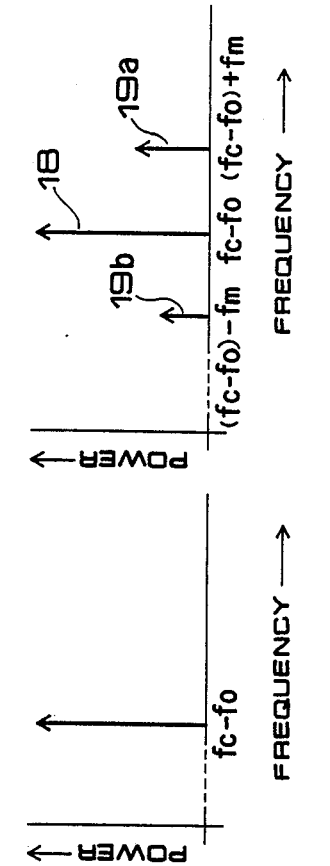
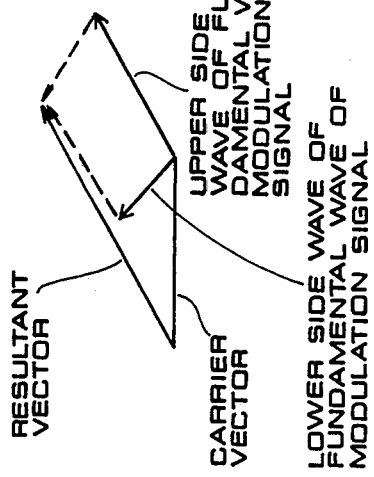
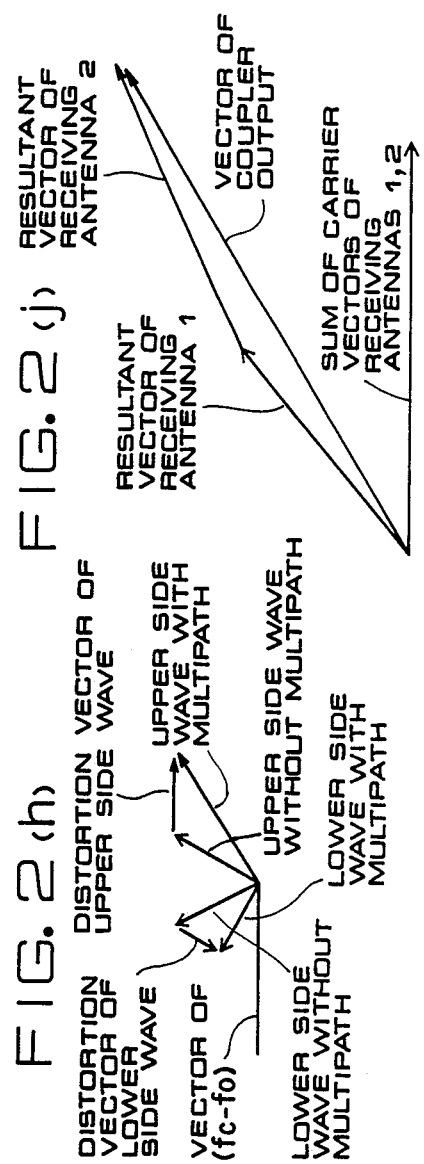

fIF: CENTER FREQUENCY OF FIRST BAND-PASS FILTER
fo : FREQUENCY OF DESIRED SIGNAL
fc : CARRIER FREQUENCY

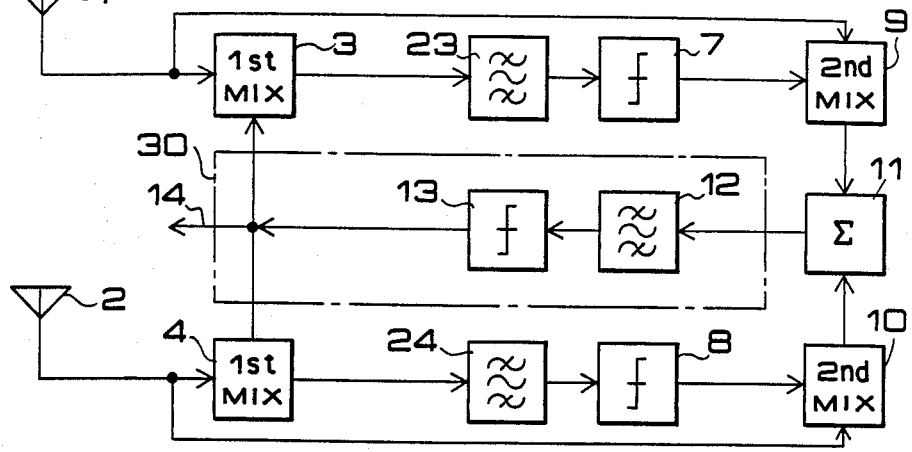
FIG. 5
1,2: RECEIVING ANTENNA
30: FEEDBACK CIRCUIT
FIG. 6(a)
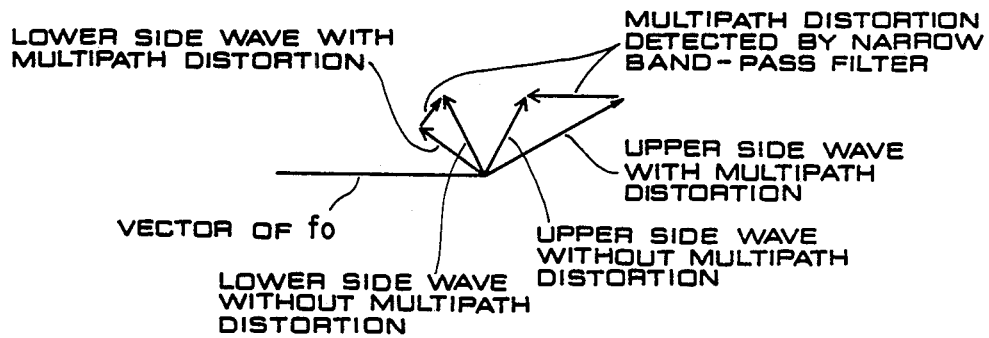
FIG. 6(b)
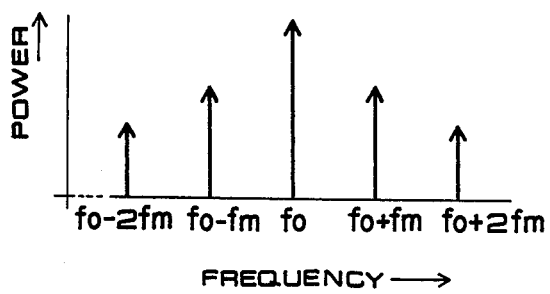

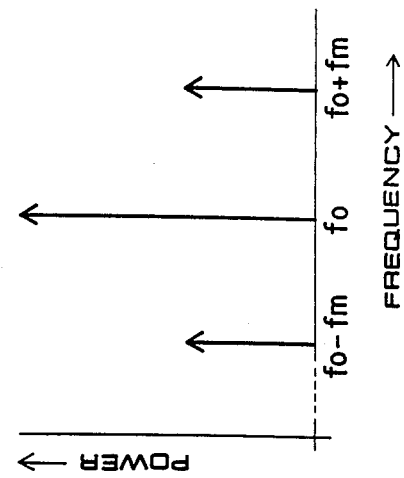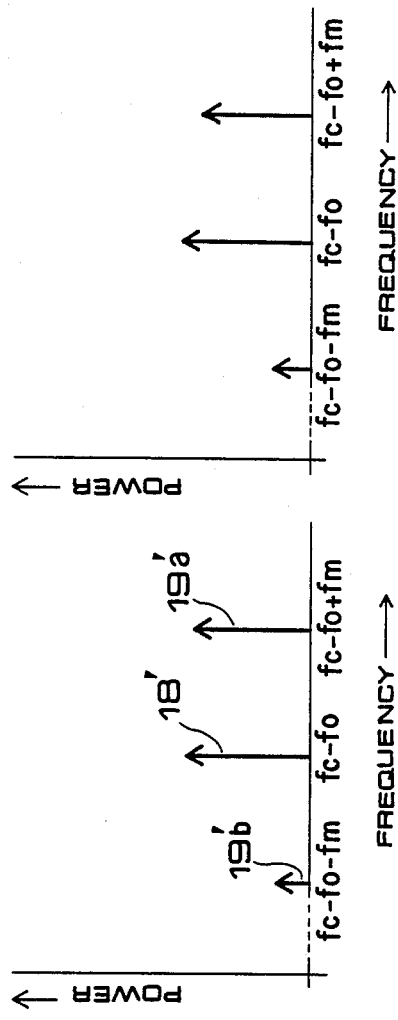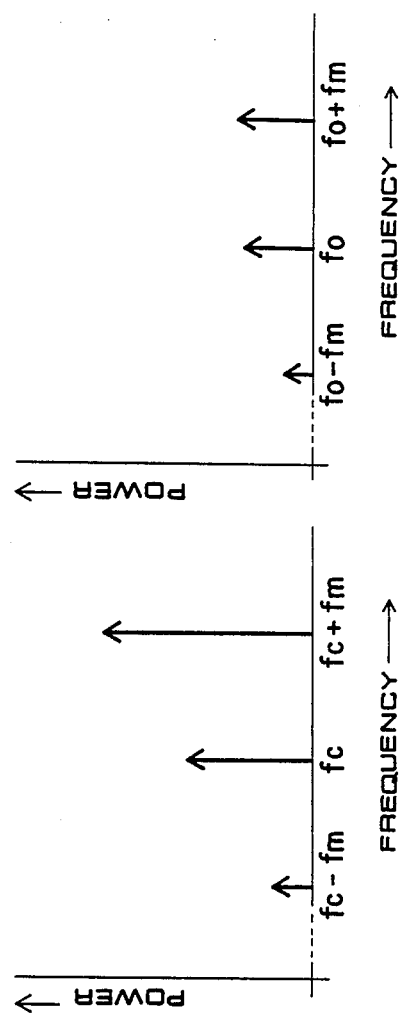

COMBINED DIVERSITY RECEIVING APPARATUS

BACKGROUND OF THE INVENTION

1. Field of the Invention

The present invention relates to a combined diversity receiving apparatus which combines two or more antenna receiving signals at the same phase in order to improve the receiving quality in a broadcasting wave where fading or frequency selective multipath distortion exists or in radio communication where fading exists.

2. Description of the Prior Art

FIG. 1 shows a combined diversity receiving apparatus in the prior art disclosed for example in Halpern [IEEE Trans. Commn., Vol. COM-22, No. 8 (1974) pp. 1099–1106]. In FIG. 1, reference numerals 1, 2 designate receiving antennas, numerals 3, 4 first mixers which take the difference frequency between signals from the receiving antennas 1, 2 respectively and output a signal of a feedback circuit 30 as hereinafter described, numerals 5, 6 narrow band-pass filters connected to output of the first mixers 3, 4 respectively, numerals 7, 8 limiters, numerals 9, 10 second mixers which take the difference frequency between output signals of the limiters 7, 8 respectively and output signals from the receiving antennas 1, 2, numeral 11 a coupler which combines the outputs of the second mixers 9, 10, and numeral 30 a feedback circuit which feeds back output signals to the first mixers 3, 4. The feedback circuit 30 has a band-pass filter 12 and a limiter 13, and numeral 14 designates the output signal thereof. The narrow band-pass filters 5, 6 require a band width which allows the random phase component due to fading to pass but the noise and modulation signal component not to pass [refer to for example Miyagaki, Morinaga, Namerikawa: Transaction (B) of the Institute of Electronics and Communication Engineers of Japan, Vol. J63-B No. 1 pp. 9–16 (1980)]. Since the apparatus has structure to form the feedback circuit, a band width as narrow as ±2–3 kHz is required in order that the receiving apparatus draw in the system (refer to for example Japanese Patent application laid-open No. 24134/1982).

Operation of the apparatus will now be described. Receiving signals $f_c \angle m(t) + \theta_1$, $f_c \angle m(t) + \theta_2$ of the receiving antennas 1, 2 are supplied to the first mixers 3, 4 and the second mixers 9, 10. Wherein $f_c$: carrier freqency, m(t): modulation signal, $\theta_1$, $\theta_2$: random phase due to fading. Then, the output signal 14 of the limiter 13 in the feedback circuit 30 becomes $f_o \angle m(t)$. $f_o$ represents the output frequency of the feedback circuit 30.

In the first mixers 3, 4, correlation between the above-mentioned received signals and output signals of the limiter 13 is taken. The correlation outputs pass through the narrow band-pass filters 5, 6, which allow the random phase due to fading to pass but eliminate the modulation signal component, and pass through the limiters 7, 8, and then become $(f_c - f_o) \angle \theta_1$, $(f_c - f_o) \angle \theta_2$ respectively. Outputs of the limiters 7, 8 are mixed at the second mixers 9, 10 with receiving signals from the feed forward circuit, and output signals of the second mixers 9, 10 become $f_o \angle m(t)$ by removing the random phase $\theta_1$, $\theta_2$. The output signals are combined by the coupler 11, and then the composite signal passes through the band-pass filter 12 and the limiter 13 and is fed back to the first mixers 3, 4.

Thus the combined diversity receiving apparatus in the prior art is constituted to remove the random phase due to fading. In the broadcasting wave, however, in addition to the random phase due to fading, frequency selective multipath distortion which distorts amplitude and phase of the modulation signal component causes a problem. In the above-mentioned apparatus in the prior art, no steps were taken with respect to the frequency selective multipath distortion. Consequently, although the multipath distortion may be removed by chance in the receiving wave of a specific level, the multipath distortion cannot be reduced in the usual case; for example, when the receiving antennas 1, 2 are supplied with an FM wave without multipath distortion and an FM wave having multipath distortion in similar degree.

The reason why the frequency selective multipath distortion is not reduced in the above-mentioned apparatus of the prior art will now be described specifically.

FIG. 2(a) serves the spectrum of an FM wave modulated by sinusoidal modulation signals without multipath. In FIG. 2(a), $f_c$ represents the carrier frequency, and $f_m$ represents the frequency of the modulation signal. Numeral 15 designates the spectrum of carrier, numeral 16a the upper side wave of the fundamental wave of the modulation signal, numeral 16b the lower side wave thereof, numeral 17a the upper side wave of the second harmonic wave of the modulation signal, and numeral 17b the lower side wave thereof. FIG. 2(b) shows a vector diagram of the FM wave in connection with FIG. 2(a). For simplification, only the fundamental wave of the modulation signal is studied but the generality is not lost. When the FM wave shown in FIG. 2(a) is inputted to the receiving antennas 1, 2, the spectrum of the output 14 of the feedback circuit 30 also becomes similar to that of FIG. 2(a). However, the carrier frequency $f_c$ is converted into the output frequency $f_o$, and this is shown in FIG. 2(c).

Next, assume that the FM wave with frequency selective multipath is inputted to the receiving antenna 2. The spectrum of the FM wave in this case is shown in FIG. 2(d), and a vector diagram thereof is shown in FIG. 2(e). Then correlation between the received signals and the output 14 of the feedback circuit 30 is achieved by the first mixers 3, 4. A vector diagram and a spectrum in the output of the first mixer 3 in a system without multipath are shown in FIG. 2(f) and FIG. 2(g) respectively. A vector diagram in the output of the first mixer 4 in system having multipath is shown in FIG. 2(h). The spectrum in this case is shown in FIG. 2(i). In FIG. 2(i), numeral 18 designates the spectrum of $(f_c - f_o)$, numeral 19a the spectrum of the multipath distortion component of the upper side band, and numeral 19b the spectrum of the multipath distortion component of the lower side band.

Since the band width of the narrow band-pass filter 6 is such as to eliminate the modulation signal component, the distortion components 19a, 19b in FIG. 2(i) do not pass. Consequently, output signals in the second mixers 9, 10 become the same as the receiving input signals and the distortion components are not removed. Output signals of the second mixers 9, 10 are combined in the coupler 11, and its output vector is shown in FIG. 2(j). It is clear that the multipath reduction effect does not exist.

Another combined diversity receiving apparatus in the prior art is disclosed in Japanese Patent application laid-open No. 125536/1982, as shown in FIG. 3. In FIG. 3, parts identical or corresponding to those in FIG. 1 are designated by the same reference numerals. Numerals 20, 21 designate amplifiers which are connected between the band-pass filter 5 and the second mixer 9 and between the band-pass filter 6 and the second mixer 10 respectively. Numeral 22 designates a detector.

Operation of the apparatus will now be described. Receiving signals $f_c\angle m(t)+\theta_1$, $f_c\angle m(t)+\theta_2$ of the receiving antennas 1, 2 are mixed at the first mixers 3, 4 with output signal $f_o\angle m(t)$ of the feedback circuit 30. The mixed signals pass through the band-pass filters 5, 6 and the amplifiers 20, 21, and the output signals become $(f_c-f_o)\angle\theta_1$, $(f_c-f_o)\angle\theta_2$ respectively. The output signals and the receiving signals are mixed at the second mixers 9, 10. Output signals of the second mixers 9, 10 are combined by the coupler 11, and the composite signal passes through the band-pass filter 12 and the limiter 13 and is fed back to the first mixers 3, 4. The output signal 14 is detected by the detector 22.

In the combined receiving apparatus constituted as in FIG. 3, difference is produced between two feed forward loops 40, 41 in the fixed phase shift, resulting in distortion or noise in the output signal of the detector 22.

The cause of above-mentioned problems in the prior art will be described. Assume that the group delay time of the band-pass filters 5, 6 is $\tau_1$, $\tau_1'$ and the delay time of the feedback circuit 30 is $\tau_2$. Also assume that the phases of the receiving signals of the receiving antennas 1, 2 are $$2\pi f_c t+\theta_1$$

$$2\pi f_c t+\theta_2$$

respectively, and the phases of the output signal 14 of the feedback circuit 30 are $2\pi f_o t$. In the first mixers 3, 4, the receiving signals and the output signal 14 of the feedback circuit 30 are mixed, and the phases of the mixed output signals become $$2\pi(f_c-f_o)t+\theta_1$$

$$2\pi(f_c-f_o)t+\theta_2$$

respectively. The output signals of the first mixers 3, 4 pass through the band-pass filters 5, 6, and the output phases become $$2\pi(f_c - f_o)(t - \tau_1) + \theta_1 = 2\pi f_{IF}(t - \tau_1) + \theta_1$$

$$2\pi(f_c - f_o)(t - \tau_1') + \theta_2 = 2\pi f_{IF}(t - \tau_1') + \theta_2$$

respectively. $f_{IF}$ represents the center frequency of the band-pass filters 5, 6. Signals passing through the band-pass filters 5, 6 are mixed at the second mixers 9, 10 with the received signals, and the phases of the output signals become $$2\pi f_o t + 2\pi f_{IF}\tau_1 \quad (1)$$

$$2\pi f_o t + 2\pi f_{IF}\tau_1' \quad (2)$$

respectively.

Signals having phases of formulae (1), (2) are combined by the coupler 11. If $\tau_1=\tau_1'$, the received signals are combined at the same phase. However, since $\tau_1$ and $\tau_1'$ do not become completely equal in the actual state, a phase difference is produced between the output signals of the second mixers 9, 10. Consequently, the phase difference may cause distortion or noise in the detector output.

According to analysis of Halpern [IEEE Trans. Commun., Vol. COM-22, No. 8 (1974) pp. 1099–1106], the frequency of the feed forward loop is represented by $$f_{IF} = \frac{f_c\tau_2 + k}{\tau_1 + \tau_2}$$

Wherein k is an integer so that $f_{IF}$ is drawn within the band width of the band-pass filters 5, 6. Consequently, if a difference exists between $\tau_1$ and $\tau_1'$, following state will occur. When the receiving antenna 1 mainly acts as $$f_{IF}=(f_c\tau_2+k)/(\tau_1+\tau_2)$$

frequency $f_o$ of the output signal 14 becomes $$f_o = f_c - f_{IF} = \frac{f_c\tau_1 - k}{\tau_1 + \tau_2}$$

Then the feed forward loop 41 of the receiving antenna 2 also acts at the frequency $f_{IF}$. When the level of the receiving antenna 1 is lowered and the receiving antenna 2 mainly acts as $$f_{IF}'=(f_c\tau_2+k)/(\tau_1'+\tau_2)$$

the frequency of the output signal 14 becomes $$f_o'=f_c-f_{IF}'$$

Consequently, the frequency of the output signal 14 jumps from $f_o$ to $f_o'$.

The phase shift of the feed forward loop occurs also due to components other than the band-pass filters 5, 6. Consequently, even if $\tau_1=\tau_1'$, the phase shift difference between the feed forward loops may occur.

In the combined diversity receiving apparatus of the prior art, output signal components from the second mixers 9, 10 are as shown in FIG. 4. In FIG. 4, $f_{IF}$ represents the center frequency of the first band-pass filters 5, 6, $f_o$ represents frequency of output signal (desired signal) from the feedback circuit, and W represents the transmission band width of the received input signal. Assuming that the delay time of the first band-pass filters 5, 6 is $\tau_1$, and the delay time and the band width of the second band-pass filter 12 is $\tau_2$, B respectively, the diversity system can be operated (i.e., the diversity effect is obtained) if following condition is satisfied.

$$\tau_3 >> \tau_2 \text{ and } W << B \quad (1)$$

Consequently, if value of $\tau_2$ is small, i.e., if value of B is large, formula (3) will be satisfied. In this case, however, spurious (unrequired wave) components exist in the band width B of the second band-pass filter 12 as shown in FIG. 4 and problems may occur as hereinafter described.

If the second band-pass filter 12 allows the $f_{IF}$ component to pass, the $f_{IF}$ component passes through the first mixers 3, 4 and then becomes the center frequency of the band-pass filters 5, 6. The components of $(f_c+f_{IF})$ is mixed at the first mixers 3, 4 with the received input signals and becomes the $f_{IF}$ component. In any of these cases, the spurious component exists and therefore the diversity effect is not obtained well.

Furthermore, in the combined diversity apparatus of the prior art, the band-pass filter 12 of the feedback circuit 30 is set to a band width such that the spurious component is removed [Suwa, Hattori: Technical Report of the Institute of Electronics and Communication Engineers of Japan, CS81-55 pp. 91-96 (1981)].

If the combined diversity receiving apparatus of the prior art is used in the receiving of a the broadcasting of wide transmission band such as FM broadcasting, problems may occur as hereinafter described. Assuming that the delay time of the band-pass filters 5, 6 is $\tau_1$, and the delay time of the band-pass filter 12 of the feedback circuit 30 is $\tau_2$, this system must satisfy the condition $\tau_1 >> \tau_2$ according to analysis of Halpern (refer to above-mentioned reference). However, if $\tau_2$ is made small so as to satisfy $\tau_1 >> \tau_2$, the band width becomes wide and the band-pass filter 12 allows not only the desired signal but also the spurious component to pass. In this state, if the receiving level is lowered, the desired signal level of the second mixers 9, 10 is also lowered, and therefore the desired signal level passing through the band-pass filter 12 becomes lower than the level of the spurious component. Consequently, the limiter 13 does not amplify the desired signal and this system does not act properly.

SUMMARY OF THE INVENTION

A first object of the invention is to provide a combined diversity receiving apparatus wherein the band width of the narrow band-pass filter is set so that not only the random phase due to fading but also the frequency selective multipath distortion component are allowed to pass.

A second object of the invention is to provide a combined diversity receiving apparatus wherein a phase difference is not produced between feed forward loops.

A third object of the invention is to provide a combined diversity receiving apparatus wherein the condition of $\tau_1 >> \tau_2$ is satisfied and malfunction due to spurious component can be prevented.

A fourth object of the invention is to provide a combined diversity receiving apparatus wherein the above-mentioned disadvantages are eliminated and the condition of $\tau_1 >> \tau_2$ and $W >> B$ is satisfied, and operation is possible even when a wide band-pass filter which passes the spurious component is used in a feedback circuit.

A fifth object of the invention is to provide a combined diversity receiving apparatus wherein unnecessary components other than desired signal can be reduced even when a signal which saturates output signal of the RF amplifier is inputted.

BRIEF DESCRIPTION OF THE DRAWINGS

FIGS. 2(a) through (j) are diagrams illustrating that the reduction effect of frequency selective multipath distortion does not exist in the apparatus of FIG. 1;

FIG. 5 is a block diagram of a combined diversity receiving apparatus as a first embodiment of the invention;

FIGS. 6(a) and (b) are diagrams illustrating the reduction effect of frequency selective multipath distortion in the apparatus of FIG. 5;

DETAILED DESCRIPTION OF THE PREFERRED EMBODIMENTS

Figure 1:
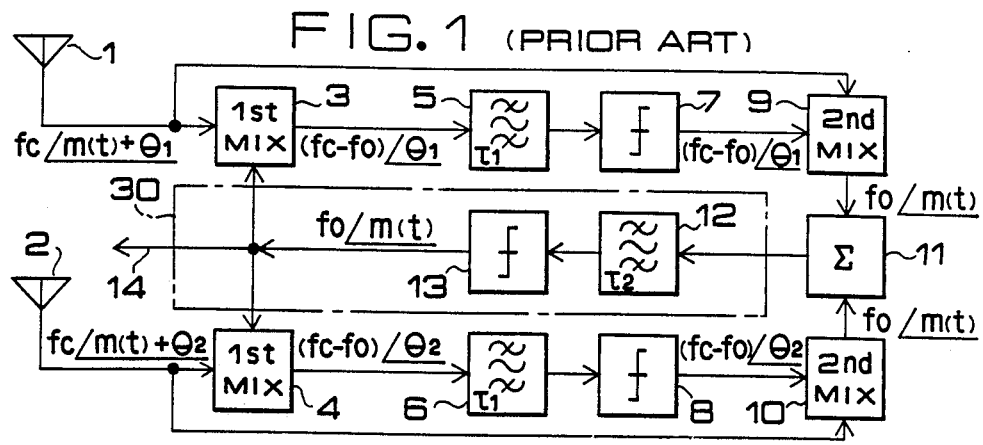
FIG. 1 is a block diagram of a combined diversity receiving apparatus in the prior art.
Figure 3:
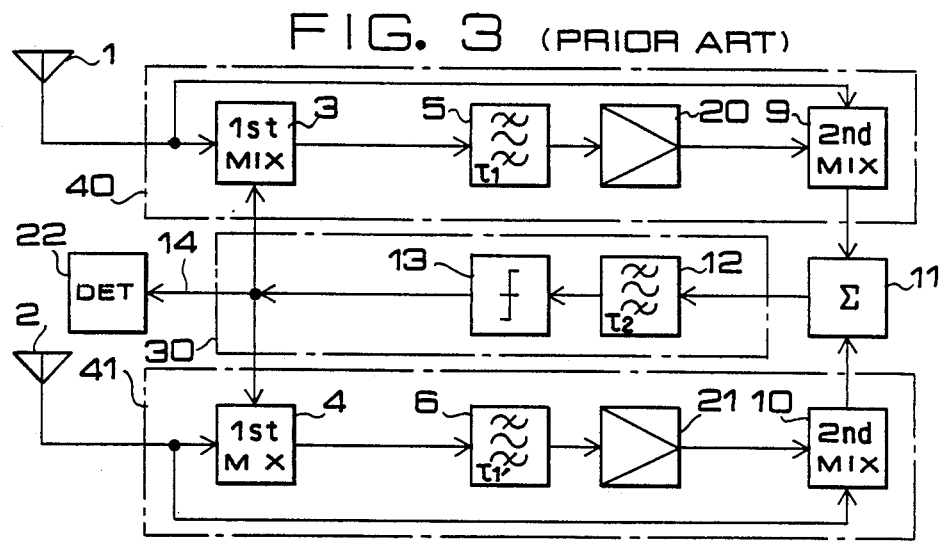
FIG. 3 is a block diagram illustrating constitution of a second combined diversity receiving apparatus in the prior art.

FIG. 5 shows a first embodiment of the invention. In FIG. 5, parts identical or corresponding to those in the figures showing the combined diversity receiving apparatus in the prior art are designated by the same reference numerals. Numerals 23, 24 designate narrow band-pass filters which accurately reflect the random phase due to fading and have a band width to allow the frequency selective multipath distortion component to pass and to eliminate the pilot signal of the FM broadcasting.

Operation of the apparatus will be described. When the FM wave without multipath as shown in FIG. 2(a) is inputted to the receiving antennas 1, 2, the apparatus acts based on the same operation principle as that of the prior art shown in FIG. 1. The output signal 14 of the feedback circuit 30 becomes the same as the received signal and its spectrum is shown in FIG. 2(c). Assume that the FM wave with frequency selective multipath distortion is inputted to the receiving antenna 2. A spectrum and a vector diagram in this case are shown in FIG. 2(d) and FIG. 2(e). Correlation of the received input signal with the output signal 14 of the feedback circuit is accomplished by the first mixers 3, 4. A vector diagram and spectrum at the output of the first mixer 3 in the system without multipath distortion are shown in FIG. 2(f) and FIG. 2(g). A vector diagram and spectrum at the output of the first mixer 4 in system with multipath distortion shown in FIG. 2(h) and FIG. 2(i), and these signals are inputted to the narrow band-pass filters 23, 24 respectively. The narrow band-pass filter 24 allows the multipath distortion components 19a, 19b to pass together with the random phase component of fading, and these pass through the limiter 8 and are inputted to the second mixer 10. At the second mixer 10, the received signal with multipath distortion component and the output signal of the limiter 8 with the multipath distortion component are mixed, thereby the output of the second mixer 10 becomes a signal without multipath distortion. In FIG. 6(a), a vector diagram shows the state that the multipath distortion is removed by the second mixer 10. Consequently, the spectrum of the signal at output of the second mixer 10 becomes as shown in FIG. 6(b).

As above described, the band width of the narrow band-pass filters 23, 24 is set to allow the random phase component due to fading to pass and the frequency selective multipath distortion component to pass, thereby the frequency selective multipath distortion is reduced.

Next, the upper limit of the band width of the narrow band-pass filters 23, 24 will be described. When the filters 23, 24 allow the distortion component of the pilot signal 19 kHz (period of about 52 $\mu$sec) of the FM broadcasting to pass, the band width of the filters 23, 24 becomes 38 kHz and the group delay time of the filters becomes 15–30 $\mu$sec. The distortion components of the pilot signal 19 kHz pass through the narrow band-pass filters 23, 24 and are inputted to the second mixers 9, 10. At the mixers 9, 10, the distortion component of the pilot signal 19 kHz of the receiving signal inputted through the feed forward circuits is to be canceled. However, the signal inputted through the filters 23, 24 is delayed by the delay time of the filters 23, 24 from the receiving signal through the feed forward circuits. Then the pilot signal of 19 kHz (period of about 52 $\mu$sec) is significantly affected by the group delay time 15–30 $\mu$sec, thereby not only the distortion component cannot be canceled but also the phase shift may cause trouble. Consequently, the upper limit of the band width of the narrow band-pass filters 23, 24 is set to a band width such that the pilot signal is removed.

Figure 7:
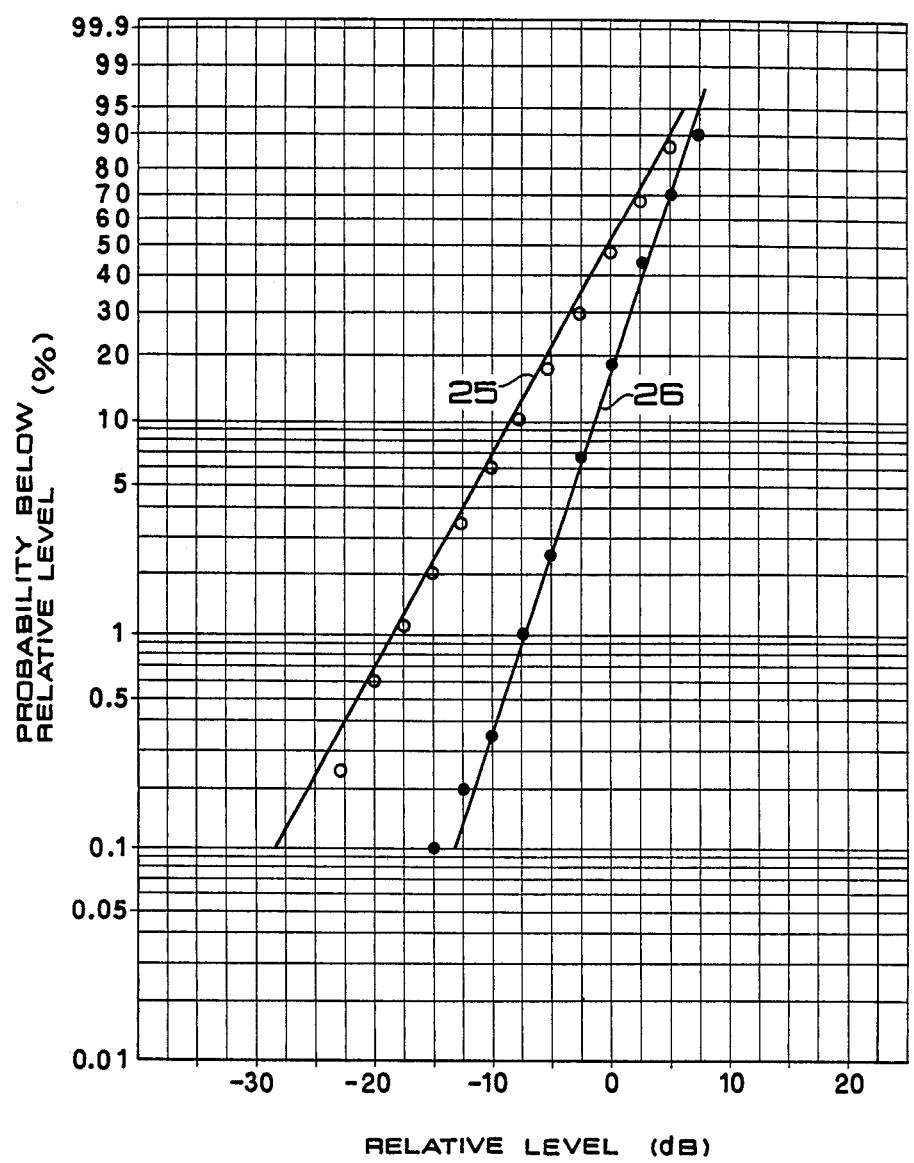
FIG. 7 is a diagram illustrating the cumulative probability distribution of the receiving level in the apparatus.

FIG. 7 shows probability below relative level in the apparatus of the first embodiment. In FIG. 7, line 25 shows theoretical value in the case of one antenna, i.e., the case of no diversity, and marks ○ show measured values. Line 26 shows theoretical value of a combined diversity at equal gain, and marks ● show measured values of the combined diversity constituted by narrow band-pass filters having the band width according to the embodiment. As clearly understood from the test results, the combined diversity receiving circuit constituted by filters having the band width of the first embodiment has the diversity effect.

Thus in the first embodiment, since the band width of the narrow band-pass filters 23, 24 is set so that the modulation signal component is allowed to pass and the pilot signal of 19 kHz of the FM broadcasting is not allowed to pass, reduction of the random phase due to fading and reduction of the frequency selective multipath distortion can be achieved without deteriorating the diversity effect.

Figure 8:
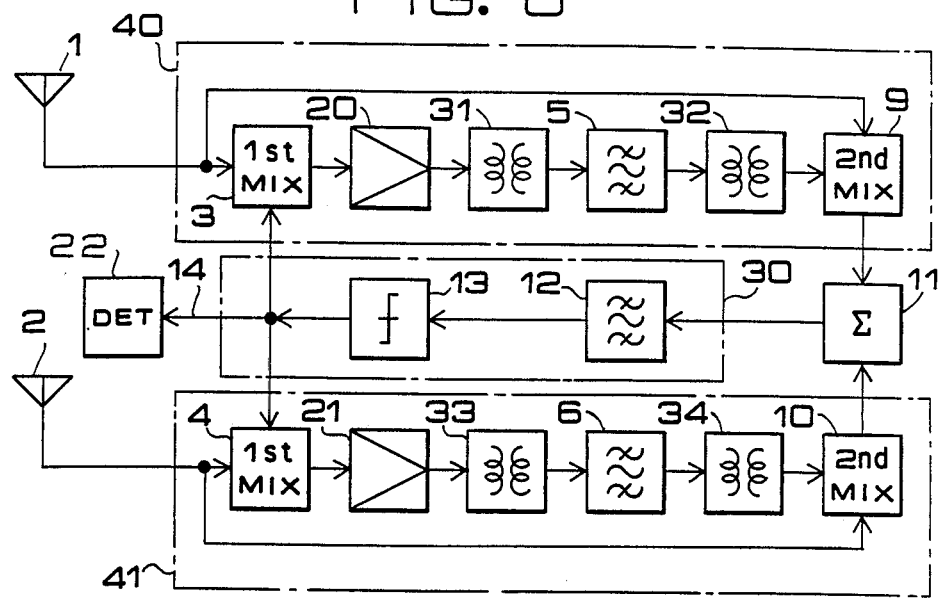
FIG. 8 is a block diagram of a combined diversity receiving apparatus as a second embodiment of the invention.

FIG. 8 shows a second embodiment of the invention. In FIG. 8, parts identical or corresponding to those in the above-mentioned combined diversity receiving apparatus are designated by the same reference numerals. Numerals 31, 32 designate transformers with adjustable group delay time (position adjusting means) installed at front and rear sides of the band-pass filter 5, and also numerals 33, 34 designate those installed at front and rear sides of the band-pass filter 6.

Operation principle and effect of the second embodiment will be described. For simplification of the description, it is assumed that each mixer is ideal and there exists no phase shift. However, even if this is not assumed, any effect of the invention is not affected.

Assume that the group delay time of the amplifiers 20, 21 be $t_1$, $t_1'$, the group delay time of the band-pass filter 5 including the transformers 31, 32 be $t_2$, and the group delay time of the band-pass filter 6 including the transformers 33, 34 be $t_2'$. Received signals and the output signal 14 of the feedback circuit 30 are mixed at the first mixers 3, 4, and when output signals of the first mixers 3, 4 are inputted to the second mixers 9, 10, the phases of the output signals of the first mixers 3, 4 become $$2\pi(f_c-f_o)(t-t_1-t_2)+\theta_1$$

$$2\pi(f_c-f_o)(t-t_1'-t_2')+\theta_2$$

respectively. Consequently, the phases of the output signals of the second mixers 9, 10 become $$2\pi f_o t + 2\pi f_{IF}(t_1+t_2)$$

$$2\pi f_o t + 2\pi f_{IF}(t_1'+t_2')$$

respectively. Then the group delay times $t_2$, $t_2'$ can be adjusted by adjusting the transformers 31, 32, 33, 34. It follows therefore that $$2\pi f_{IF}(t_1+t_2)=2\pi f_{IF}(t_1'+t_2') \tag{4}$$

That is, the received signals can be combined at the same phase. The signals at the same phase pass through the feedback circuit 30, and following relation applies.

$$2\pi f_o t = 2\pi f_o(t - \tau_2) + 2\pi f_{IF}(t_1 + t_2) - 2k\pi \tag{5}$$

Hence $$f_{IF} = \frac{\tau_2 f_c + k}{t_1 + t_2 + \tau_2}$$

By adjusting $t_2$, $t_2'$ from formulae (4), (5), the receiving signals can be combined at the same phase and $f_{IF}$ can be made the center frequency of the band-pass filters 5, 6. Accordingly, distortion or noise is not produced in the output of the detector 22.

Although the transformers are installed at front and rear sides of the band-pass filters in the second embodiment, the transformers may be installed at front side or rear side of the band-pass filters. Or, the transformers may be installed at output and input of the first mixer and the amplifier respectively or at input of the second mixer. Further, the transformers may be replaced by a tuning circuit, and an effect similar to that of the embodiment can be obtained.

Although the phase adjusting means is provided in each feed forward loop in the second embodiment, it may be provided in one feed forward loop only, and an effect similar to that of the embodiment can be obtained.

Further, the invention can be applied to a receiver utilizing intermediate frequency, and an effect similar to that of the embodiment can be obtained.

Figure 9:
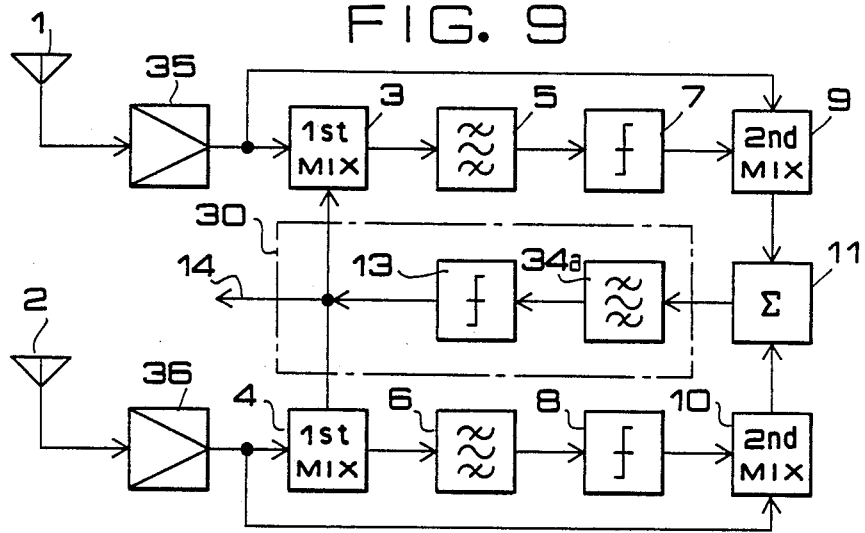
FIG. 9 is a block diagram of a combined diversity receiving apparatus as a third embodiment of the invention.

FIG. 9 shows a third embodiment of the invention. In FIG. 9, parts identical or corresponding to those in the above-mentioned combined diversity receiving apparatus are designated by the same reference numerals. Numeral 34a designates a band-pass filter having a band width to pass not only the desired signal but also the spurious component. Numerals 35, 36 designate amplifiers which amplify received signals before these signals are distributed in the first mixers 3, 4 and the second mixers 9, 10.

The apparatus of the third embodiment in the above-mentioned constitution acts based on the same operation principle, and therefore only different parts will now be described. The desired signals and the spurious components exist at the outputs of the second mixers 9, 10. When these signals are inputted to the band-pass filter 34a, since the band width of the band-pass filter 34a of the third embodiment is wide in comparison to the prior art, the spurious component passes without being eliminated and thereby the input level of the receiving antennas 1, 2 is lowered. Then the desired signal level becomes lower than the level of the spurious component passing through the filter 34a as above described. In order to prevent this state, the received signals are amplified by the amplifiers 35, 36 so that the desired signal level passing through the filter 34a does not become lower than the level of the spurious component. Thus the limiter 13 amplifies the desired signal, and this system can be operated satisfactorily.

In the apparatus of the third embodiment, since the receiving signals are amplified and then inputted to the first mixers 3, 4 and the second mixers 9, 10, even if the band width of the band-pass filter of the feedback circuit becomes wide so as to satisfy the condition of $\tau_1 \gg \tau_2$, the desired signal level does not become lower than the level of the spurious component; thereby the receiving apparatus can be used in FM broadcasting where the transmission band width is wide.

Although the amplifiers are installed between the antennas and the first mixers and the received signals are amplified before being distributed in the first mixers and the second mixers in the third embodiment, the amplifiers may be installed in a position so that the received signals inputted from the antennas to the second mixers can be amplified.

Figure 10:
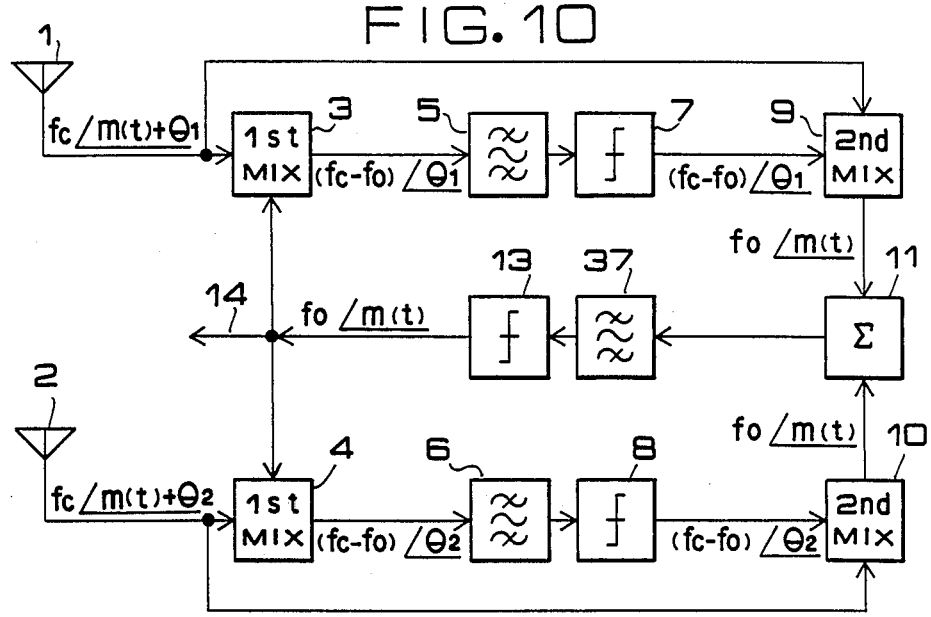
FIG. 10 is a block diagram of a combined diversity receiving apparatus as a fourth embodiment of the invention.

FIG. 10 shows a fourth embodiment of the invention. In FIG. 10, parts identical or corresponding to those in the above-mentioned combined diversity receiving apparatus are designated by the same reference numerals. Numeral 37 designates a band-pass filter installed in the feedback circuit. The band width of the band-pass filter 37 is the band width $B_o$ shown in FIG. 4. Spurious components among those generated during frequency mixing in the second mixers 9, 10 are supplied to the first mixers 3, 4 and mixed in frequency mixing with signals from the receiving antennas 1, 2 and then supplied to the first band-pass filters 5, 6. The band width $B_o$ is such that when the spurious components are supplied to the first band-pass filters 5, 6 only the spurious components which disturb the desired signals passing through the first band-pass filters 5, 6 are removed.

The apparatus of the fourth embodiment shown in FIG. 10 acts based on the same operation principle as the combined diversity receiving apparatus in the prior art shown in FIG. 1. However, the band-pass filter 37 according to the fourth embodiment allows the components of $2f_{IF}$, $f_o$ and $f_c$ to poor but eliminates the components of $f_{IF}$, $f_c+f_{IF}$. That is, the band width is $B_o$ shown in FIG. 4. Consequently, the component of $f_{IF}$ is not contained in the output components from the mixers 3, 4, and therefore does not become the component in the band width of the band-pass filters 5, 6.

Although the limiters 7, 8 are installed at the rear side of the first band-pass filters 5, 6 in the fourth embodiment, they may be installed at front side of the band-pass filters 5, 6. Furthermore, the limiters 7, 8 may be replaced by band amplifiers.

The limiter 13 may be replaced by an amplifier.

Figure 11:
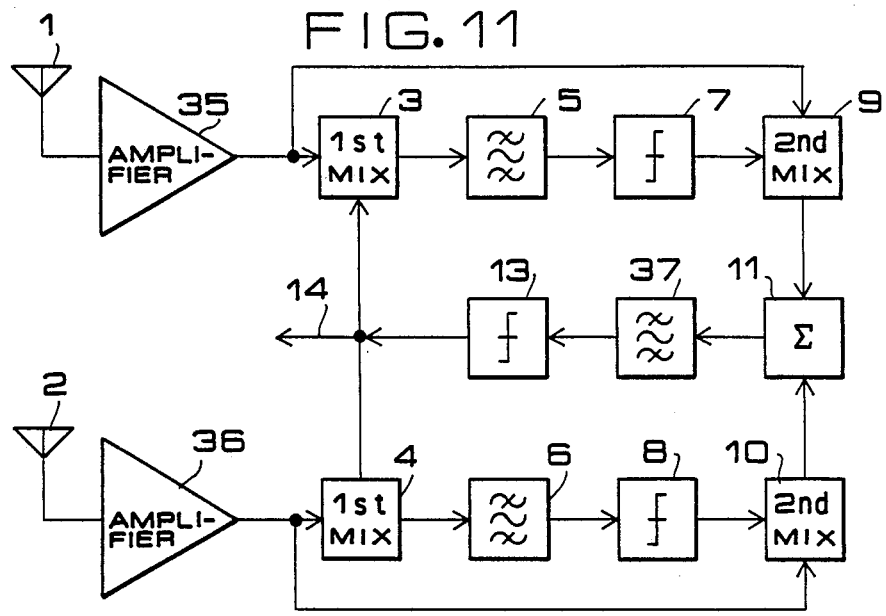
FIG. 11 is a block diagram of a combined diversity receiving apparatus as a fifth embodiment of the invention.

FIG. 11 shows a fifth embodiment of the invention. The fifth embodiment is characterized in that a band-pass filter 37 is installed between the coupler 11 and the limiter 13 in the feedback circuit. The band width of the band-pass filter 37 is the band width $B_o$ shown in FIG. 4. That is, the band width $B_o$ is such that when the spurious components among those generated during frequency mixing in the second mixers 9, 10 are supplied to the first mixers 3, 4 and mixed in frequency mixing with signals from the receiving antennas 1, 2 and then supplied to the first band-pass filters 5, 6 respectively, only the spurious components which disturb the desired signals passing through the first band-pass filters 5, 6 are removed.

Further, the fifth embodiment is characterized in that amplifiers 35, 36 are installed in paths of the receiving antennas 1, 2 and the first mixers 3, 4 and amplify the input receiving signals from the receiving antennas 1, 2 so that level of the desired signal is made higher than that of the spurious component passing through the band-pass filter 37.

The apparatus of the fifth embodiment acts based on the same operation principle as the combined diversity receiving apparatus in the prior art. However, the band-pass filter 37 according to the fifth embodiment allows to pass the components of $2f_{IF}$, $f_o$ and $f_c$ in FIG. 4 but eliminates the components of $f_{IF}$, $f_c+f_{IF}$. Consequently, the components of $f_{IF}$ and $f_c+f_{IF}$ are not contained in the output components from the first mixers 3, 4 and therefore do not become the components in the band width of the first band-pass filters 5, 6.

Next, the case where the input received signal level is lowered will be considered. Then in the receiving apparatus of the prior art, the spurious component $2f_{TF}$ having a higher level than that of the desired signal $f_o$ from the second mixers 9, 10 is outputted and thereby the receiving apparatus cannot act properly. However, in the receiving apparatus of the fifth embodiment, the amplifiers 35, 36 amplify the input signals from the receiving antennas 1, 2, and supply the amplified signals to the first mixers 3, 4 and the second mixers 9, 10 respectively. Consequently, signals from the limiters 7, 8 and the input signals amplified by the amplifiers 35, 36 are mixed in frequency mixing at the second mixers 9, 10 respectively. Thereby the level of the desired signal component $f_o$ becomes higher than that of the component $2f_{IF}$ and the desired signal component $f_o$ can be amplified by the limiter 13. Thus the above-mentioned problems in the prior art can be solved.

Although the amplifiers 35, 36 are installed before the input signals are distributed to the first mixers 3, 4 and the second mixers 9, 10 in the fifth embodiment, the amplifiers 35, 36 may be installed before the second mixers 9, 10 so that the input signals are distributed and only the input signal components to be supplied to the second mixers 9, 10 are amplified.

Further, the amplifiers 35, 36 of the invention may be band limiting amplifiers which do not amplify components other than the received signals.

Although the limiters 7, 8 are connected between the band-pass filters 5, 6 and the second mixers 9, 10 respectively in the fifth embodiment, the limiters 7, 8 may be installed between the first mixers 3, 4 and the band-pass filters 5, 6 respectively.

Moreover, the limiters 7, 8 and 13 may be replaced by amplifiers.

Figure 12:
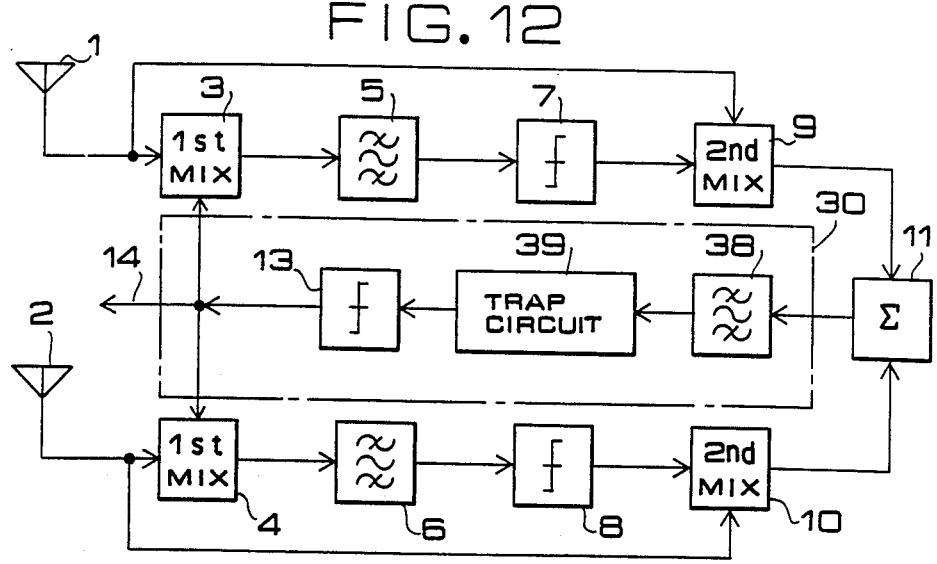
FIG. 12 is a block diagram of a combined diversity receiving apparatus as a sixth embodiment of the invention.

FIG. 12 shows a sixth embodiment of the invention. In FIG. 12, parts identical or corresponding to those in the above-mentioned combined diversity receiving apparatus are designated by the same reference numerals. Numeral 38 designates a band-pass filter having wide band width in comparison to the prior art so as to pass the desired signal and the spurious component, and numeral 39 designates a trap circuit which inhibits passing of the spurious components $f_{IF}$, $(f_c+f_{IF})$ to disturb signals of the band-pass filters 5, 6 among signals passing through the filter 38.

Figure 4:
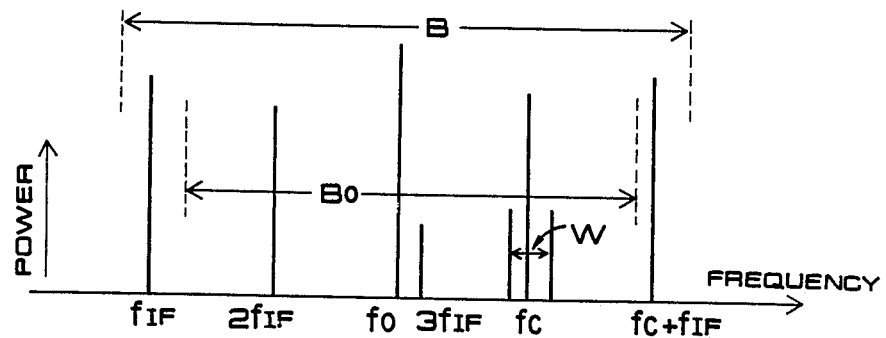
FIG. 4 is a diagram illustrating the spurious component contained in output of a second mixer.

The apparatus of the sixth embodiment in the above-mentioned constitution acts based on the same operation principle as the prior art. However, the band-pass filter 38 has wider band width so as to satisfy condition of $\tau_1 >> \tau_2$ (W<<B); thereby the spurious components shown in FIG. 4 are allowed to pass. The spurious components and the desired signals are inputted to the trap circuit 39, and the spurious components $f_{IF}$, $(f_c+f_{IF})$ are caught in the trap circuit 39. Consequently, the output components of the trap circuit 39 become components $2f_{IF}$, $f_o$, $3f_{IF}$, $f_c$, thereby spurious components $F_{IF}$ and $f_c+f_{IF}$, which are outputted from the second mixers 9,10, pass through the feedback circuit 30 and the first mixers 3,4 and thereby the signal component $f_{IF}$ of the band-pass filters 5,6 is not disturbed.

In the apparatus of the sixth embodiment, since the band width of the band-pass filter 38 is made wider, the relation between the delay time $\tau_1$ of the filters 5, 6 and the delay time $\tau_2$ of the filter 38 becomes $\tau_1 >> \tau_2$. Further, the spurious components which pass through the filter 38 and would become disturbing waves in the filters 5, 6 can be removed by the trap circuit 39; thereby the receiving apparatus in the sixth embodiment can be used in FM broadcasting having wide transmission band width.

Although the trap circuit 39 is installed at rear side of the band-pass filter 38 in the sixth embodiment, the trap circuit 39 may be installed at front side of the band-pass filter or at rear side of the limiter 13. Or, trap circuits 39 may be provided at the outputs of the second mixers 9, 10.

Although the band-pass filters 5, 6 are installed at front side of the limiters 7, 8 in the embodiment, the band-pass filters 5, 6 may be installed at rear side of the limiters 7, 8. Further, the limiters 7, 8, 13 may be replaced by amplifiers.

Figure 13:
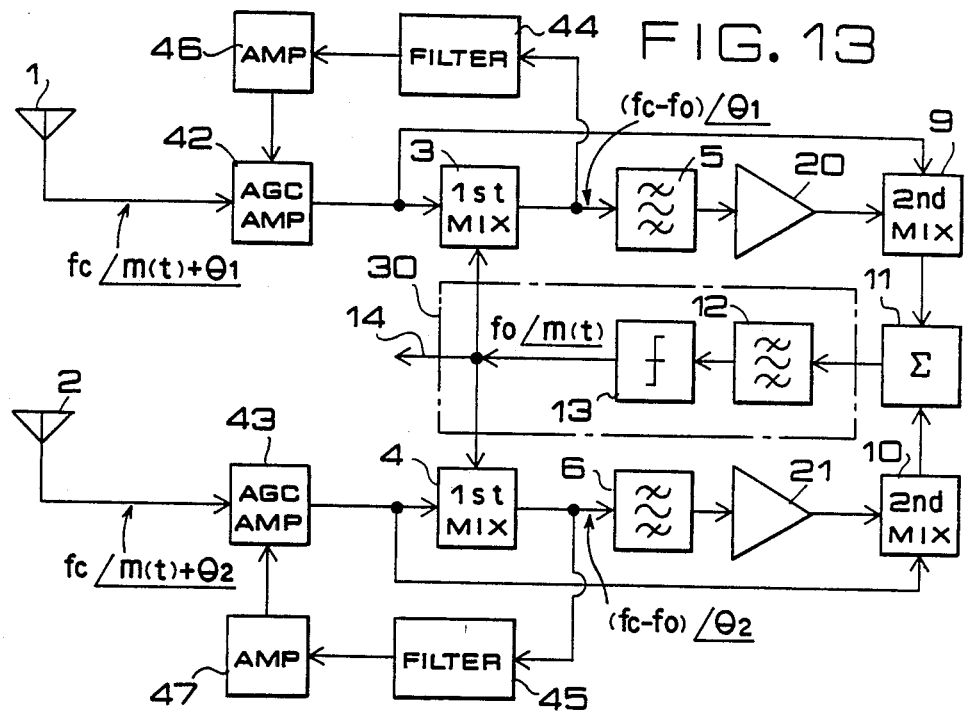
FIG. 13 is a block diagram of a combined diversity receiving apparatus as a seventh embodiment of the invention.

FIG. 13 shows a seventh embodiment of the invention. In FIG. 13, parts identical or corresponding to those in the above-mentioned combined diversity receiving apparatus are designated by the same reference numerals. Numerals 42, 43 designate AGC amplifiers, numerals 44, 45 filters to remove the $(f_c-f_o)$ component and pass the unnecessary components among the received waves, and numerals 46, 47 amplifiers which amplify the unnecessary components extracted by the filters 44, 45. The filters 44, 45 and the amplifiers 46, 47 constitute AGC amplifier gain control means to limit the gain of the AGC amplifiers 42, 43 corresponding to the level of the unnecessary signal components. Since the receiving level varies depending on the fading period, the time-constant of the AGC amplifiers 42, 43 is set shorter than the variation time of the receiving level.

Operation of the apparatus will be described.

Figure 14:
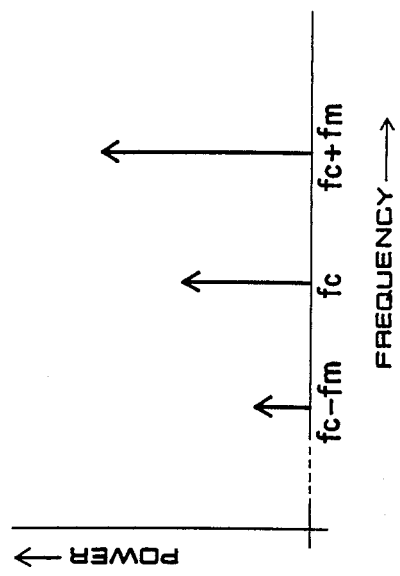
FIGS. 14(a) through (i) are signal spectrum diagrams illustrating the operation of the seventh embodiment.
Figure 14:
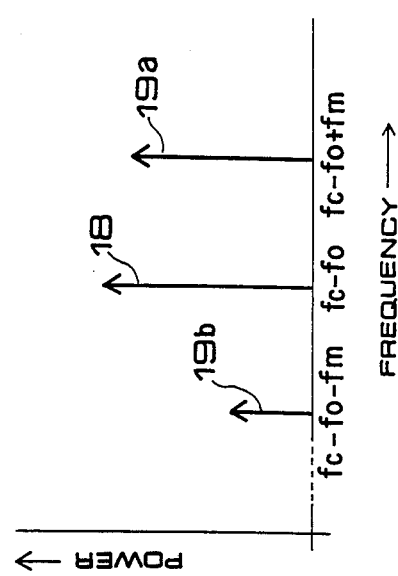
Figure 14:
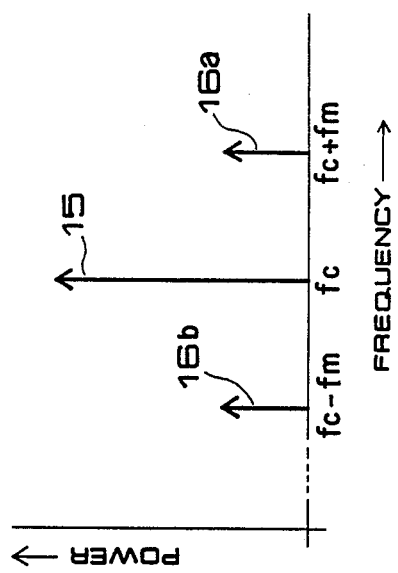
Figure 14:
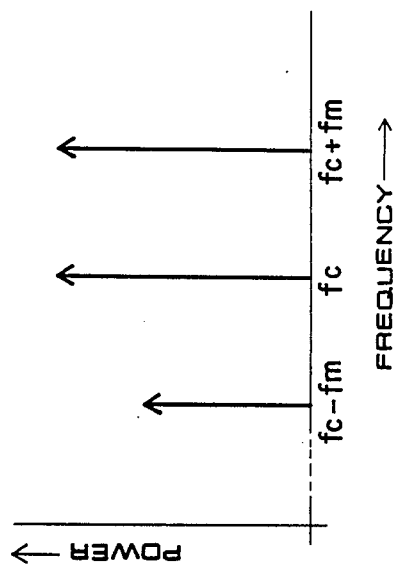

When the FM wave without multipath as shown in FIG. 14(a) is inputted to the receiving antennas 1, 2, the apparatus acts in similar manner to the combined diversity receiving apparatus in the prior art. When the FM wave with multipath distortion as shown in FIG. 14(b) is inputted to the receiving antenna 2, the signal is amplified by the AGC amplifier 43. If the output signal from the AGC amplifier 43 is saturated, the output signal becomes the signal shown in FIG. 14(c). Consequently, the spectrum of the output signal from the first mixer 4 becomes as shown in FIG. 14(d).

If multipath distortion exists, as shown in FIG. 14(d), multipath distortion components 19a, 19b are outputted by the first mixer 4. In comparison to the multipath distortion components 19a', 19b' [FIG. 14(e)] when the signal from the AGC amplifier 43 is amplified linearly, the level of the multipath distortion components 19a, 19b at the saturated state is large. Consequently, only the multipath distortion components 19a, 19b are extracted by the filter 45, and corresponding to the extracted results the gain of the amplifier 43 is limited proportional to the degree of the multipath distortion. When the gain of the AGC amplifier is limited, the spectrum component of the signal from the AGC amplifier 43 is changed from that shown in FIG. 14(c) to that shown in FIG. 14(f). Consequently, the spectrum component of the output signal from the first mixer 4 becomes as shown in FIG. 14(g). The spectrum of the output signal of the second mixer 10 in the system with multipath distortion becomes as shown in FIG. 14(h), and the spectrum of the output signal of the second mixer 9 in the system without multipath distortion becomes as shown in FIG. 14(i). These signals are combined by the coupler 11 and, thereby the reduction effect of multipath distortion becomes possible.

In the apparatus of the embodiment, the receiving signal from the antenna is amplified by the AGC amplifier and the multipath distortion component is detected and the gain of the AGC amplifier is controlled by the detection level. Thereby amplifying can be performed corresponding to the received state of the receiving wave and reduction of the multipath distortion is always possible.

In the seventh embodiment, unnecessary components other than the multipath distortion component can be also detected by the filters 44, 45, and all unnecessary components other than $(f_c-f_o)$ component can be reduced.

Figure 15:
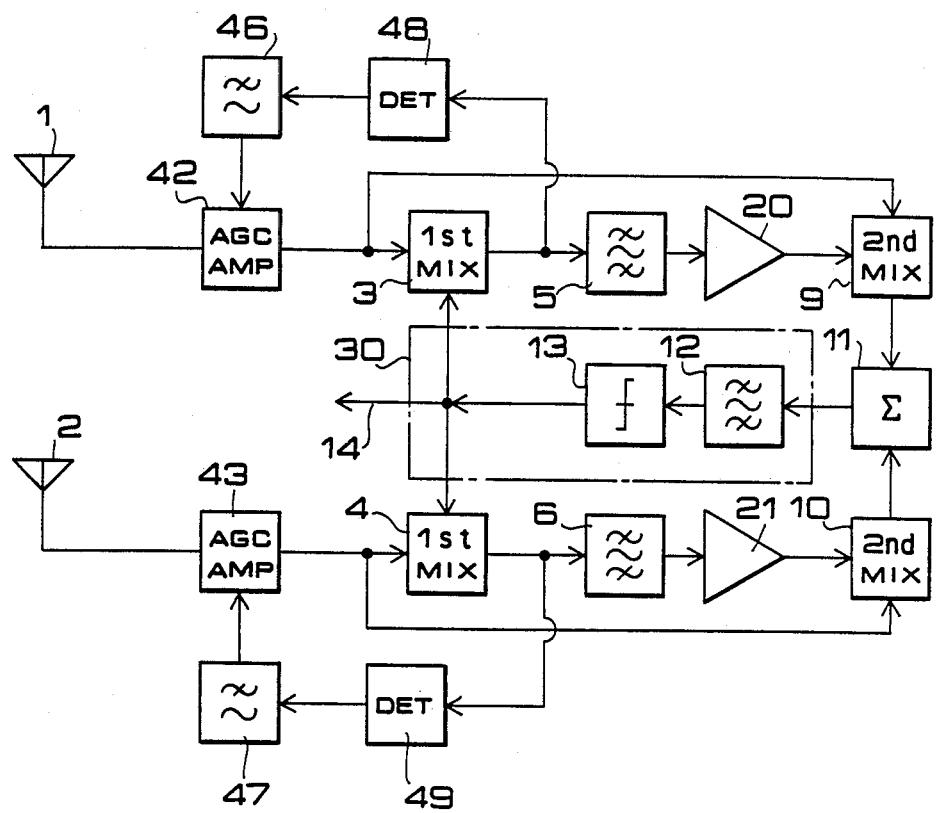
FIG. 15 is a diagram illustrating an eighth embodiment of the invention.

In the seventh embodiment, unnecessary components other than the desired signal can be detected by the filters 44, 45 to remove the $(f_c-f_o)$ component and to pass the unnecessary component to the amplifiers 46, 47. However, as shown in FIG. 15, unnecessary components other than the desired signal can be detected also by quadratic envelope detectors 48, 49 and low pass filters 46, 47, an effect similar to that of the seventh embodiment can be obtained.

In the seventh and eighth embodiments, although the amplifiers 20, 21 are installed at rear side of the band-pass filters 5, 6, these may be installed in reverse order.

Further, in the above-mentioned embodiments, connection to a receiver utilizing an intermediate frequency is possible, and an effect similar to that of the embodiments can be obtained.

What is claimed is:

1. A combined diversity receiving apparatus for receiving FM broadcasting signals which include a pilot signal at 19 kHz
    first mixers for mixing received signals from at least two antennas respectively with a signal from a feedback circuit;
    narrow band-pass filters connected to the outputs of said first mixers respectiely and having a band width such as to pass a random phase component due to fading and a main component of a modulation signal among received signals;

second mixers for mixing the output signals of said narrow band-pass filters with the received signals respectively;

a coupler for combining the outputs of said second mixers; and a feedback circuit for feeding-back the output signal of said coupler to said first mixers;

the upper limit of the band width of said narrow band-pass filter being set so as not to pass the pilot signal of 19 kHz in FM broadcasting.

2. A combined diversity receiving apparatus comprising first mixers for mixing received signals from at least two antennas respectively with a signal from a feedback circuit as hereinafter recited;

band-pass filters connected to the outputs of said first mixer respectively;

second mixers for mixing the output signals of said band-pass filters with the received signals respectively;

a coupler for combining the outputs of said second mixers;

a feedback circuit for feeding-back the output signal of said coupler to said first mixers; and phase adjusting means installed between at least one of said first mixers and said second mixers for adjusting phase shift of the apparatus, said phase adjusting means comprising at least one transformer; said phase adjusting means being installed at the front and the rear sides of said band-pass filters.

3. A combined diversity receiving apparatus wherein signals from a plurality of antennas including a carrier frequency and a desired signal pass through diversity branches provided on the plurality of antennas respectively and are combined by a coupler, and the output of the coupler is outputted through a feedback circuit having a second band-pass filter, each of said diversity branches comprising:

a first mixer for performing frequency combining of a signal from said antenna with an output signal of said feedback circuit;

a first band-pass filter for allowing only a prescribed band component among signals from said first mixer to pass;

a second mixer for performing frequency mixing of a signal from the antenna with a signal from the first band-pass filter and supplying the mixed signal to said coupler;

said second band-pass filter having a band width such as to remove spurious components which disturb the signal allowed to pass through the first band-pass filter;

said second band-pass filter having a band width such as to pass components of double the frequency of the center frequency of said first band-pass filter, the frequency of a desired signal and the carrier frequency and to remove components of the center frequency of said first band-pass filter and the sum of the carrier frequency and the center frequency of said first band-pass filter.

4. A combined diversity receiving apparatus comprising:

first mixers for mixing received signals from at least two antennas respectively with a signal from a feedback circuit;

first band-pass filters connected to the outputs of said first mixers respectively;

second mixers for mixing the output signals of said first band-pass filters with the received signals respectively;

a coupler for combining the outputs of said second mixers;

a second band-pass filter connected to said coupler having a band width such as to pass a desired signal and spurious components; and said feedback circuit feeding back the output signal of said coupler to said first mixers; and a trap circuit installed at rear side of said second mixers to remove the spurious components which disturb said first band-pass filters.

5. A combined diversity receiving apparatus as set forth in claim 4, wherein the spurious components are a component of the center frequency of said first band-pass filters and the sum of the center frequency of the first band-pass filters and the carrier frequency.

6. A combined diversity receiving apparatus as set forth in claim 4, wherein each of said first band-pass filters has a band width such as to pass a random phase component due to fading and a main component of a modulation signal among received signals.

7. A combined diversity receiving apparatus for receiving FM broadcasting signals subject to variation due to fading over a time interval, said signals including a carrier frequency and a desired signal, comprising:

AGC amplifiers for amplifying received signals from a plurality of antennas respectively;

first mixers for mixing the output signals of said AGC amplifiers respectively with a signal from a feedback circuit;

first band-pass filters connected to the outputs of said first mixers respectively;

second mixers for mixing the output signals of said first band-pass filters with the output signals of the AGC amplifiers respectively;

a coupler for combining the outputs of said second mixers;

said feedback circuit feeding back the output signal of said coupler to said first mixers; and AGC amplifier gain control means for detecting the level of unnecessary signal components other than a desired signal among received signals from each first mixer output and limiting the gain of the AGC amplifier corresponding to the detected results.

8. A combined diversity receiving apparatus as set forth in claim 7, wherein each of said AGC amplifiers has a response time shorter than the time of the fading interval.

9. A combined diversity receiving apparatus as set forth in claim 7, wherein the AGC amplifier gain control means includes a filter which removes a component of frequency of carrier frequency subtracted by the frequency of a desired signal.

10. A combined diversity receiving apparatus as set forth in claim 7, wherein the AGC amplifier gain control means includes a quadratic envelope detector and a low pass filter.

11. A combined diversity receiving apparatus as set forth in claim 7, wherein each of said band-pass filters has a band width such as to pass a random phase component due to fading and a main component of a modulation signal among received signals.

* * * * *

UNITED STATES PATENT AND TRADEMARK OFFICE
CERTIFICATE OF CORRECTION

PATENT NO. : 4,748,682
DATED : May 31, 1988
INVENTOR(S) : Tadamasa Fukae and Hiroshi Noda It is certified that error appears in the above-identified patent and that said Letters Patent is hereby corrected as shown below:

Column 2, line 19, "serves" should be --shows--.

Column 4, line 53, "(1)" should be --(3)--.

Column 8, line 48, after "amplifier" insert --,--;
        same line, after "respectively" insert --,--.

Column 9, line 21, "receiving" should be --received--;
        line 57, "poor" should be --pass--.

Column 10, line 34, "$2f_{TF}$" should be --$2f_{IF}$--.

Column 12, line 24, "14(b)" should be --14(h)--.
        line 50, after "47," insert --and--.

Signed and Sealed this

Twenty-first Day of March, 1989

*Attest:*

DONALD J. QUIGG

*Attesting Officer*  *Commissioner of Patents and Trademarks*